UNITED STATES PATENT OFFICE.

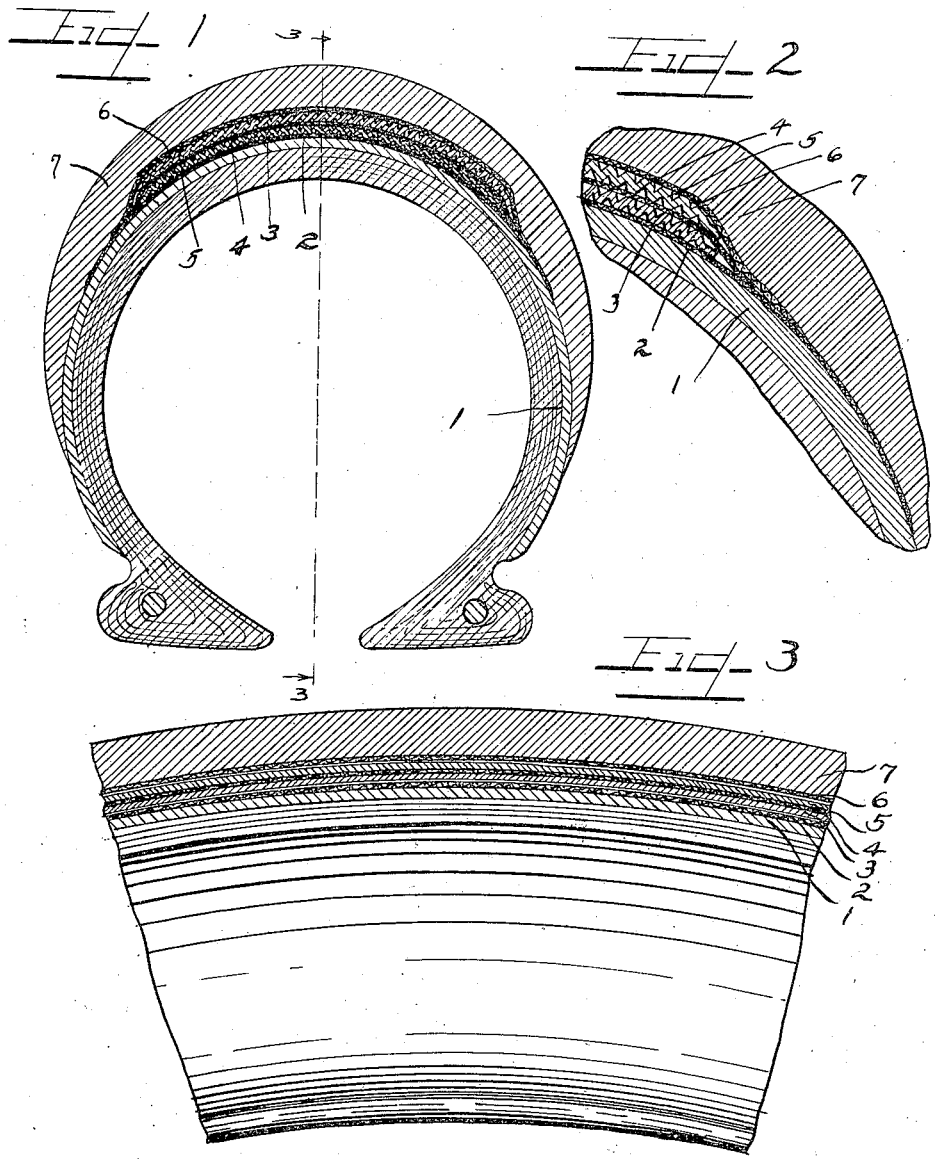

FRANC D. MAYER, OF CHICAGO, ILLINOIS.

TIRE CONSTRUCTION.

1,425,788.  Specification of Letters Patent.  Patented Aug. 15, 1922.

Application filed August 14, 1919. Serial No. 317,529.

*To all whom it may concern:*

Be it known that I, FRANC D. MAYER, a citizen of the United States, and a resident of the city of Chicago, in the county of Cook and State of Illinois, have invented certain new and useful Improvements in a Tire Construction; and I do hereby declare that the following is a full, clear, and exact description of the same, reference being had to the accompanying drawings, and to the numerals of reference marked thereon, which form a part of this specification.

This invention relates to pneumatic tires more particularly for use with automobiles.

In tires as constructed heretofore the body of the tire itself possesses little resiliency and is subjected to great strain when the tire is moved circularly with respect to the road as in steering.

It is an object, therefore, of the present invention to provide a form of tire which is resilient apart from the cushioning effect of the inner tire.

A further object of the invention is to provide a tire having greater resiliency laterally than longitudinally so that it will yield readily when the tire is moved circularly with respect to the road as in steering.

A still further object of this invention is to provide a tire, the tread of which is adapted to yield in a horizontal direction when the tire is in use, so that any strain in such direction as may be caused by steering, skidding, and turning corners at high speeds will be absorbed by the tread itself, thereby minimizing the danger of blowouts, rimcuts, and the like.

Other and further important objects of this invention will be apparent from the disclosures in the drawings and specification.

My invention (in a preferred form) is illustrated in the drawings and hereinafter more fully described.

On the drawings:—

Figure 1 is a transverse section through a tire constructed in accordance with the present invention.

Figure 2 is a view on an enlarged scale of a portion of the tire as shown in Figure 1.

Figure 3 is a section on the line 3—3 of Figure 1.

As shown in the drawings:—

The tire comprises an inner carcass 1 of common form and construction. Around the carcass 1 a layer of fabric 2 is arranged. On this layer of fabric is laid a strip of resilient material 3, preferably rubber, having corrugations therein running circumferentially of the tire. Outside this strip 2 is arranged a second layer of fabric 4 overlapping the strip 2 laterally so that its edges may be secured to the fabric 2. Next a second corrugated strip 5 is placed on the layer of fabric 4 preferably with the bottom of its corrugations registering with the tops of the corrugations of the strip 3. Then a third layer of fabric or breaker strip 6 is arranged over the second strip 5 with its edges overlapping both the latter and also the margins of the fabric 4. This breaker strip 6 is of the improved shape and construction as shown in the drawings instead of the short straight breaker strip heretofore commonly used. Finally the tread is placed around the built up structure and the various elements are united by vulcanization.

It will be seen that the completed tire has formed therein a series of air cells running circumferentially around the tire which considerably add to the resiliency of the tire.

Further in using this tire the construction just described results in greater resiliency in a horizontal plane than has heretofore been possible so that there is less internal friction and less shear or tearing action created by the circular movement of the tire about an axis perpendicular to the road surface when the vehicle is at rest or travelling slowly; this condition being caused by the action of the wheels in steering. This same shearing action is also caused by skidding or by turning corners at high speeds.

I am aware that numerous details of construction may be varied through a wide range without departing from the principles of this invention and I therefore do not purpose limiting the patent granted further than necessitated by the prior art.

I claim as my invention:—

1. An outer casing for a tire comprising an inner carcass, a layer of fabric around the carcass, a strip of rubber upon the fabric having corrugations running circumferentially of the tire, a second layer of fabric over the strip of rubber, a second strip of rubber upon the second layer of fabric having corrugations running circumferentially of the tire the bottoms of the latter corrugations registering with the tops of the corrugations on the first strip, a third layer of fabric over the second strip and a tread secured to the third layer of fabric.

2. A tire casing comprising an inner carcass, a tread and two layers of resilient material therebetween each having corrugations therein running longitudinally of the tire, the bottoms of the corrugations on the upper layer registering with the tops of the corrugations on the lower layer.

3. In a tire, an inner carcass, a fabric partially covering said inner carcass, a tread, a fabric partially covering the inner surface of said tread and overlapping the lateral edges of the fabric on said carcass, and a resilient cushioning element between said fabrics and corrugated to provide air containing recesses.

In testimony whereof I have hereunto subscribed my name in the presence of a subscribing witness.

FRANC D. MAYER.

Witness:
CHARLES W. HILLS, Jr.